(12) United States Patent
Takrouri et al.

(10) Patent No.: US 11,631,044 B2
(45) Date of Patent: Apr. 18, 2023

(54) METHOD AND DEVICE FOR TRACKING THE UNLOADING AND LOADING OF CONTAINERS FROM AND ONTO TRUCKS USING MOTION ACTIVITY PATTERNS OF THE CONTAINERS

(71) Applicant: CYBERGREEN LTD., Qalansuwa (IL)

(72) Inventors: Thabit Takrouri, Qalansuwa (IL); Yossi Israeli-Shalev, Qalansuwa (IL)

(73) Assignee: CYBERGREEN LTD., Qalansuwa (IL)

( * ) Notice: Subject to any disclaimer, the term of this patent is extended or adjusted under 35 U.S.C. 154(b) by 566 days.

(21) Appl. No.: 16/498,622

(22) PCT Filed: Mar. 26, 2018

(86) PCT No.: PCT/IL2018/000004
§ 371 (c)(1),
(2) Date: Sep. 27, 2019

(87) PCT Pub. No.: WO2018/185739
PCT Pub. Date: Oct. 11, 2018

(65) Prior Publication Data
US 2020/0104791 A1  Apr. 2, 2020

Related U.S. Application Data

(60) Provisional application No. 62/480,461, filed on Apr. 2, 2017.

(51) Int. Cl.
*G06Q 10/08* (2012.01)
*H04W 4/60* (2018.01)
(Continued)

(52) U.S. Cl.
CPC .......... *G06Q 10/0833* (2013.01); *B60P 1/649* (2013.01); *B60P 1/6454* (2013.01);
(Continued)

(58) Field of Classification Search
CPC ............ G06Q 10/0833; G06Q 10/0832; B60P 1/6454; B60P 1/649; B65D 90/48;
(Continued)

(56) References Cited

U.S. PATENT DOCUMENTS

2007/0261894 A1  11/2007  Harish
2009/0299520 A1  12/2009  Binding et al.
(Continued)

FOREIGN PATENT DOCUMENTS

DE            1103499   *  5/2001   ............. B65G 47/38

OTHER PUBLICATIONS

International Search Report, International Application No. PCT/IL2018/000004 dated May 31, 2018.

*Primary Examiner* — Alexander Satanovsky
(74) *Attorney, Agent, or Firm* — The Roy Gross Law Firm, LLC; Roy Gross

(57) ABSTRACT

The present invention is a method and a device for tracking the unloading and loading of containers from and onto carrying platforms of tracks, using unloading and loading motion activity time course patterns characteristic of a specific container in combination with a specific carrying platform of a truck. In the invention the device is connected to a specific container and records the tilting angle of the container in the time course of unloading and/or loading from and onto a specific platform of the truck. A digital data processor produces from the data a motion activity time course pattern curve which is compared and matched for fitness to a predetermined standard motion activity time course pattern curve for the specific container and specific carrying platform of a truck and sends the degree of fitness to a data receiving terminal system. If the fitness of the two curves is found to be in close fitness, together with GPS data from the device, it is possible to determine if, where and (Continued)

when unloading and loading of the specific container took place.

13 Claims, 8 Drawing Sheets

(51) Int. Cl.
    *H04W 4/029*         (2018.01)
    *B60P 1/64*           (2006.01)
    *B65D 90/48*         (2006.01)
    *G01D 9/00*          (2006.01)
    *G06Q 10/0833*      (2023.01)
    *G06Q 10/0832*      (2023.01)

(52) U.S. Cl.
    CPC .............. *B65D 90/48* (2013.01); *G01D 9/005* (2013.01); *G06Q 10/0832* (2013.01); *H04W 4/029* (2018.02); *H04W 4/60* (2018.02)

(58) Field of Classification Search
    CPC ........ G01D 9/005; H04W 4/029; H04W 4/60; G01C 21/14
    See application file for complete search history.

(56) References Cited

U.S. PATENT DOCUMENTS

2013/0041623 A1    2/2013    Kumar et al.
2017/0370765 A1*  12/2017   Meier ........................ G01S 1/00
2020/0225258 A1*   7/2020    Beaupre ................... G01P 3/48

* cited by examiner

METHOD AND DEVICE FOR TRACKING THE UNLOADING AND LOADING OF CONTAINERS FROM AND ONTO TRUCKS USING MOTION ACTIVITY PATTERNS OF THE CONTAINERS

RELATED APPLICATIONS

This application is a National Phase of PCT Patent Application No. PCT/IL2018/000004 having International filing date of Mar. 26, 2018, which claims the benefit of priority of U.S. Provisional Application No. 62/480,461 filed on Apr. 2, 2017. The contents of the above applications are all incorporated by reference as if fully set forth herein in their entirety.

FIELD OF THE INVENTION

The present invention relates to a method and a device for tracking the unloading and loading of containers from and onto carrying platforms of trucks. More specifically, the present invention relates to a method and a device for tracking the unloading and loading activities of a specific combination of a specific container and a specific carrying platform on a truck by comparing and matching the fitness of the specific time course pattern curves derived from the spatial angular motions of the container to specific standard predetermined time course pattern curves.

BACKGROUND OF THE INVENTION

Typically, companies dealing with the loading, storage, transport and unloading of containers have to manage and control the handling of a large fleet of containers, in some cases, many thousands of containers. In order to control the whereabouts of its containers, companies can deploy various electronic tracking devices and systems. Example of such a systems is given in U.S. Pat. No. 8,659,420 (Salvat Roberto):

U.S. Pat. No. 8,659,420 (Salvat Roberto) describes a tracking device and system that integrates various electronic technologies to enable an individual to locate and monitor the movement of a container at any given time and for any desired time-period. The tracking system utilizes virtual geo-fences to identify buildings or specific addresses to assist in determining the specific location of the containers in relation to these buildings or specific addresses. The tracking devices can also be activated by motion sensors, to alert the tracking system of a possible theft of the container or sudden movement. The tracking system incorporates software which enables an individual to determine the location of the containers, determine the contents of the containers, and schedule the use of the containers by specific persons and at specific locations. U.S. Pat. No. 8,659,420 does not provide information in regards to the actual action of unloading and loading activates of a container, as related to in the present invention.

The monitoring activity of the containers in accordance with the present invention is done by recording motion-activity patterns versus time for each specific container in the course of unloading and loading of the container from and onto a carrying platform of a truck and comparing the recorded activity-patterns to predetermined unloading and loading standard motion-activity patterns for that specific combination of the container and the carrying platform on the truck. The present invention facilitates tracking data of the actual loading and unloading activities of containers, hour by hour, for companies interested in monitoring the multitask activities of their container-fleets.

SUMMARY OF THE INVENTION

The term "container" is defined by the Merriam Webster dictionary (https://www.merriam-webster.com/dictionary/container) as "a large box that goods are placed in so that they can be moved from one place to another on a ship, airplane, train, or truck". The term "vehicles" in the context of the present text refers to the moving means of containers, and includes ships, airplanes, trains and trucks. The same dictionary defines "goods" as: "something that has economic utility or satisfies an economic want", and defines "deploy" as: "to utilize, or arrange for a deliberate purpose". The term "goods" in the text is interchangeable with the term: "contents of the container'.

The term "carrying platform" in the context of the invention is understood to mean a substantially flat and horizontal surface of a vehicle having a spatial configuration approximately parallel to the ground, on top of which a container is placed for transporting.

The term "truck" in the context of the invention is a road-traveling vehicle with a carrying platform and is also understood to mean a road-traveling wagons having carrying-platforms ("semitrailers" or independent-trailers) that reversibly connect to towing road-travelling vehicles and to railway cars having carrying-platforms. Unless otherwise specified in the text, the term "specific carrying platform on a truck' means a carrying platform connected to a specific truck or/and a road-traveling wagon.

Thus, the term "specific carrying platform" refers to a specific combination of a specific carrying platform with a specific truck.

The term "tracking" in the context of the invention refers to being able to record the geographical location were a specific container was within a determined time frame and to be able to record if, when and where, within the determined time frame, the specific container was unloaded and/or loaded from the carrying platform on which it was carried.

In the context of the present invention the term "container" refers to intermodal containers that are typically designed and built for intermodal transport of goods (by: ship/rail/truck) without the need of unloading and reloading of their content. Typically, when transported by land, intermodal containers are reversibly connected to the carrying platform of trucks and/or the carrying-platforms of wagons or to the carrying-platforms railway cars.

Intermodal containers are typically durable closed steel boxes, the "standard containers", most commonly used, are either twenty or forty foot (6 or 12 m) standard length, The common heights are 8 feet 6 inches (2.6 m) and 9 feet 6 inches (2.9 m). Intermodal containers are primarily used to store and transport materials and products efficiently and securely in the global containerized intermodal freight transport system. Intermodal containers are also used in short distance, local transport, of cargo. (Source: https://en.wikipedia.org/wiki/Intermodal_container).

An additional meaning of the term "container" in the context of the present invention, refers to containers that are not "standard", intermodal containers. Such containers are either open-top boxes or closed box containers, typically, but not necessarily, made of steel and come in a variety of volumes and dimension. These containers are typically transported on the carrying-platforms of trucks and are utilized for transporting of commercial-good loads (such as, but not limited to, construction materials and agricultural products) and waste loads (such as, but not limited to, construction waste loads and industrial and municipal collected waste loads).

In yet another meaning of the term "container" in the context of the present invention refers to revolving drums mounted on trucks. The trucks with drums, typically referred to as "concrete mixing transport trucks" (or, often called a "cement mixer trucks") are used for the simultaneous production and transport of concrete. The drums of the trucks homogeneously combines cement, aggregate such as sand or gravel, and water to form concrete. Concrete mixer trucks are made to transport and mix concrete up to the construction site. They can be charged with dry materials and water, with the mixing occurring during transport. They can also be loaded from a "central mix" plant, with this process the material has already been mixed prior to loading. The concrete mixing transport truck maintains the material's liquid state through agitation, or turning of the drum, until delivery. The interior of the drum on a concrete mixing truck is fitted with a spiral blade. In one rotational direction, the concrete is pushed deeper into the drum. This is the direction the drum is rotated while the concrete is being transported to the building site. This is known as "charging" the mixer. When the drum rotates in the other direction, the Archimedes' screw-type arrangement "discharges", or forces the concrete out of the drum. From there it may go onto chutes to guide the viscous concrete directly to the job site. (source of information, web site: https://en.wikipedia.org/wiki/Concrete_mixer.)

The reference to the terms "unloading" and "loading" in the present text is presently explained. The activities of unloading and loading of a container from and onto a carrying platform may be in the sequence of unloading-and-then-loading or, alternatively, in the reverse order of loading-and-then-unloading. In the unloading-and-then-loading and in the reversed order, loading-and-then-unloading, the spatial angle change versus time of a specific container and a specific carrying platform do not necessarily have the same motion activity time course pattern curves. (the term "motion activity time course pattern curves" is explained later in the text).

The term "unloading" in the context of the present invention refers to the sequence of activates associated with the tilting of containers from an approximately horizontal spatial configuration till reaching a maximum tilting angle. Typical examples of unloading and loading of containers, explaining the use of the terms are presently given.

In the case of a loose container to be placed on the ground, or on a platform below the truck (shown in FIG. 5), the "unloading" in the context of the present invention, refers to the sequence of activities associated with the gradual change in the spatial configuration in the longitudinal dimension of a container to a tilted angle on the verge of sliding from the back end of the truck (and kept from sliding by the tilting/lifting mechanism).

In the case of container that remain connected to the carrying platform of a truck (shown in FIG. 7 and FIG. 8), the unloading is done by gradually lifting the longitudinal-edge of the container (the edge in the direction of the front of the truck), thus, increasing the angle of titling from an approximate horizontal spatial configuration on a carrying platform of a truck to a maximum tilt angle. The tilting is carried out to an angle that causes the contents in the container to gradually slide from container to the ground from the back of the truck. Typically, the unloading terminates with the emptying of the contents from the container.

The term "loading" in the context of the present invention refers to the sequence of activities of changing the spatial configuration of a container from the maximum tilting angle to an approximate horizontal spatial configuration.

In the case of loose containers (shown in FIG. 5), the loading refers to the gradual sliding of the container from the back of the truck (manifested by the gradual decreasing of the tilting angle from the maximum tilting angle reached at the end of the unloading) till reaching the ground and then lowering the container to the ground till it is in an approximate horizontal spatial configuration (shown in FIG. 5).

In the case of containers that remain connected to the carrying platforms of truck (FIG. 7 and FIG. 8) the maximum tilting angle achieved in the unloading of the container is followed by loading in which there is a gradual decrease in the tilting angle till the container is in an approximate horizontal spatial configuration on the carrying platform The unloading and loading of containers from and onto a carrying platform is typically, but not necessarily, done by a self-sufficient lifting/lowering mechanical (typically, hydraulically operated) loading and unloading mechanism connected to a truck.

In another alternative, the "unloading" and "loading" in context of the present invention, refer to the motion activities of a revolving drums mounted on a concrete mixing transport truck. The rotation motion in one direction is referred to as an "unloading" motion activity (replacing the lifting activity of a container from a carrying platform) and the rotational motion in the opposite direction is a referred to as a "loading" motion activity (replacing the lowering activity of a container to a carrying platform). In the context of the revolving drums mounted on a concrete mixing transport truck, the "discharging" rotational direction of the rotating drum is referred to as the "unloading" of a concrete mixing transport truck and the "charging' rotational direction of" the rotating drum is referred to as the "loading" of a concrete mixing transport truck.

Presently, the using of recorded data of the angle of tilting during unloading and loading of containers from and onto carrying platforms for tracking the activities of the containers is explained:

In the course of the unloading and loading (or, alternatively, the sequence of loading and unloading) a sequence of motion activities take place.

In unloading (as previously explained), as the container gradually tilts, the tilting angle of a container changes and reaches a maximum tilting degree-value. The container remains static at the maximum tilting angle for a time period (short or long, depending on circumstances). Following the static period the loading of the container takes place. In the course of loading the tilt angle of the container is gradually reduced till the container is in an approximate horizontal spatial configuration.

The tilt sensor records the angle of the container relatively to the carrying platform in the time elapse from start of unloading till the end of the loading. A GPS chip is also connected to the container. The recorded data of the angle of tilting is transmitted from the sensor to a digital data processor. Using the transmitted data, the digital data processor produces a motion activity time course pattern curve (or curves). Data from the GPS chip is also transmitted in parallel to the digital data processor.

When presented as a visible data display (graphed on a screen or printed on paper) a motion time-course pattern curve relates the tilting angle of the container versus time. Examples of motion time-course pattern curves are shown in (57) in FIG. 6 and (61) in FIG. 9.

Presently the process of producing standard motion activity time course pattern curves is explained:

The motion activity time course pattern curves change in accordance with the combination of the specific carrying platform on the specific truck that carries a specific container (weight, size, material made of) and also depend on the goods contained in the container. If the combination is not changed, the produced motion activity time course pattern curves are substantially similar. In cases were the combination is changed, a new set of similar motion activity time course pattern curves is produced.

By experimentally producing motion activity time course curve(s) of specific combinations of specific containers (either empty or carrying approximately the same good) and specific carrying platforms (on specific trucks) a set of substantially similar motion activity time course curve(s) becomes available. The data from the substantially similar motion activity time course pattern curves are aggregated and averaged by the digital data processor. The averaged motion activity time course pattern curve is stored by the digital data processor and is referred to as a specific "standard motion activity time course pattern curve". Examples of standard motion activity time course pattern curve is given in (58) of FIG. 6 and (62) of FIG. 9.

Presently the analysis process of the recorded data of the angle of tilting during unloading and loading of containers from and onto carrying platforms for tracking the activities of the containers is explained:

Each of the produced specific motion time-course curve (previously explained) is compared and matched with the appropriate specific standard motion time-course curve for fitness. The algorithm of the digital data processor is programmed to determine the degree of matching between specific motion time-course curves and standard specific motion time-course curves and to determine when the two curves "fit, meaning that the similarity between the two curves was found to be close enough to recognize the specific motion time-course curve as generated from data recorded in the course of an unloading and loading activity event of the specific container.

By determining close fitness between specific motion activity time course pattern curves and the specific standard curve(s) and adding the data transmitted to the digital data processor from the GPS chip, the digital data processor produces an output tracking record which is transmitted to a SIM card and transmitted via a GSM network (having a GSM chip and a transmitting antenna) to a terminal where is can be viewed (in either graphically or/and written form). The tracking record includes, but not limited to, if, how many times and when, in a given time frame, a given load of goods in the container that left a depot was unloaded (an example: the dispensing of construction material in various building locations, or the dumping of wastes along an assignment, or the removal of boxed goods). The tracking can also include the number of times and when a container was removed ("unloaded") from the carrying platform of the truck (or alternatively, emptied) or/and replaced ("loaded") back on the carrying platform (or alternatively, the container refilled).

Alternatively to motion activity time course curves derived by relating time elapse to the tilting angle data of a container, as previously explained (shown in FIG. 6 and FIG. 9), in the case of revolving drums mounted on trucks, "motion activity time course curves" are produced by correlating the time elapse from the start and speed of the unloading (the discharging rotational motion) to the end of the unloading rotational motion or/and to the time elapse between the start and speed of loading (charging rotational motion) to the start and speed of the unloading (the discharging rotational motion). In revolving drums mounted on trucks the tilting sensor records and transmits to the digital data processor the angle of the sensor (the sensor being connected to the revolving drum) relatively to the horizontal carrying platform on the carrying truck. The recorded changing angle of the revolving drum, changing from 0 degrees to 180 degrees, having gone through half a rotation and continues to 270 degrees and to 0 degrees, having completed the second half of the rotation. The motion activity time course curve continues if after the unloading, a loading motion (charging rotational motion) is resumed and it continues until the motion terminates.

Thus, with the tilt sensor recording the rotational motion the specific motion activity time course pattern curves of revolving drums mounted on trucks are in the form of sinusoidal waves. In the unloading and loading (charging rotational motion) the specific motion activity time course pattern curves are seen as a break in the sinusoidal wave-curve patterns caused by the reversing of the rotational direction of the drum as well as the amplitude of the waves and their density.

By the aggregating and averaging by the digital data processor motion activity time course pattern curves of several specifically determined loading and unloading activities of revolving drums mounted on trucks (the specific drum mounted on a specific truck and having a specific amount/weight of concrete) standard curve(s) are determined and stored. The analysis of the fitness of specific motion activity time course pattern curves of revolving drums mounted on trucks with standard specific motion activity time course pattern curves is done as was previously explained.

It should be noted that the shape of the motion activity time course pattern curves (examples of which are shown in FIG. 6 and FIG. 9) may vary widely and are not necessarily in the shape of smooth lines (in cases when the lifting and lowering of containers is not done in one continuous stretch.

The present invention is a method for tracking the unloading and loading of containers from and onto carrying platforms of trucks, using unloading and loading motion activity time course patterns characteristic of a specific container in combination with a specific carrying platform of a truck. The method of tracking is carried out by using a device which is connected to the specific container tracked. The device records the tilting angle of the specific container in the time course of unloading and/or loading from and onto a specific platform of a truck, producing a motion activity time course pattern curve. The motion activity time course pattern curve is compared and matched to predetermined standard motion activity time course pattern curve(s) of the specific container and specific carrying platform of a truck, to determine the fitting between the two motion activity time course pattern curves. If a good fitting is found, the data is transmitted to a data receiving terminal system, enabling, together with GPS data transmitted the data receiving terminal system via the digital data processor, to determine if, where and when unloading and loading of the specific container took place.

The device for tracking the unloading and loading of a specific container from and onto a specific carrying platform of a truck, using the unloading and loading motion activity patterns produced by the specific container is composed of: A data receiving terminal system and an encasing box.

The encasing box, typically made of a rigid material such as, but not limited to, rigid plastic of metal such as steel, is composed of the components:

a digital data processor, a GPS (Global Positioning System), a GSM chip, a tilt sensor, and a SIM card, an electricity supply source, typically a rechargeable battery.

The encasing box is reversible and firmly connected to said container, and the components of the encasing box are firmly fixated within the encasing box.

The tilt sensor records the spatial angle configuration of tilt configuration of the specific container during the time duration of unloading and loading of the container from and onto said carrying platform of a truck and transmits the recorded data to the digital data processor. In parallel to the data sent from the tilt sensor, the GPS sends data to the digital data processor.

The digital data processor processes the tilt recorded data to produce a motion activity time course pattern curve specific to the specific container and compares and matches the produced specific motion activity time course pattern curve to standard a motion-activity pattern curve for the combination of the specific container and the specific carrying platform of a specific truck.

By preforming a fitness analysis between the specific motion activity time course pattern curve and the predetermined standard a motion-activity pattern curve, together with the GPS data, said digital data processor determines if there is a close fitness and by so determines when and where an unloading and loading of the specific container took place, The determination of unloading and loading of the specific container is transmitted to the SIM card and is transmitted by the GSM network to the data receiving terminal system.

Optionally, the rechargeable battery is recharged, when needed, by an electricity generator connected to the container and out of the encasing box.

Optionally, the components of encasing box also include a shock sensor which records data from the vibrations of the container when the container is travelling on the carrying platform. The recorded data is transmitted to the digital data processor which turns on and off the electricity to electricity consuming components of the device, thus saving stored electricity.

Optionally, the encasing box also includes at least one strong magnet which reversibly connects said encasing box to the specific container.

Optionally, the data receiving terminal system is a computer system and/or a smart telephone.

The specific motion activity time course pattern curves and standard motion-activity pattern curves for specific containers that are revolving drums mounted on trucks are in the form of a sinusoidal wave curve.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF PREFERRED EMBODIMENT

Figure 1:
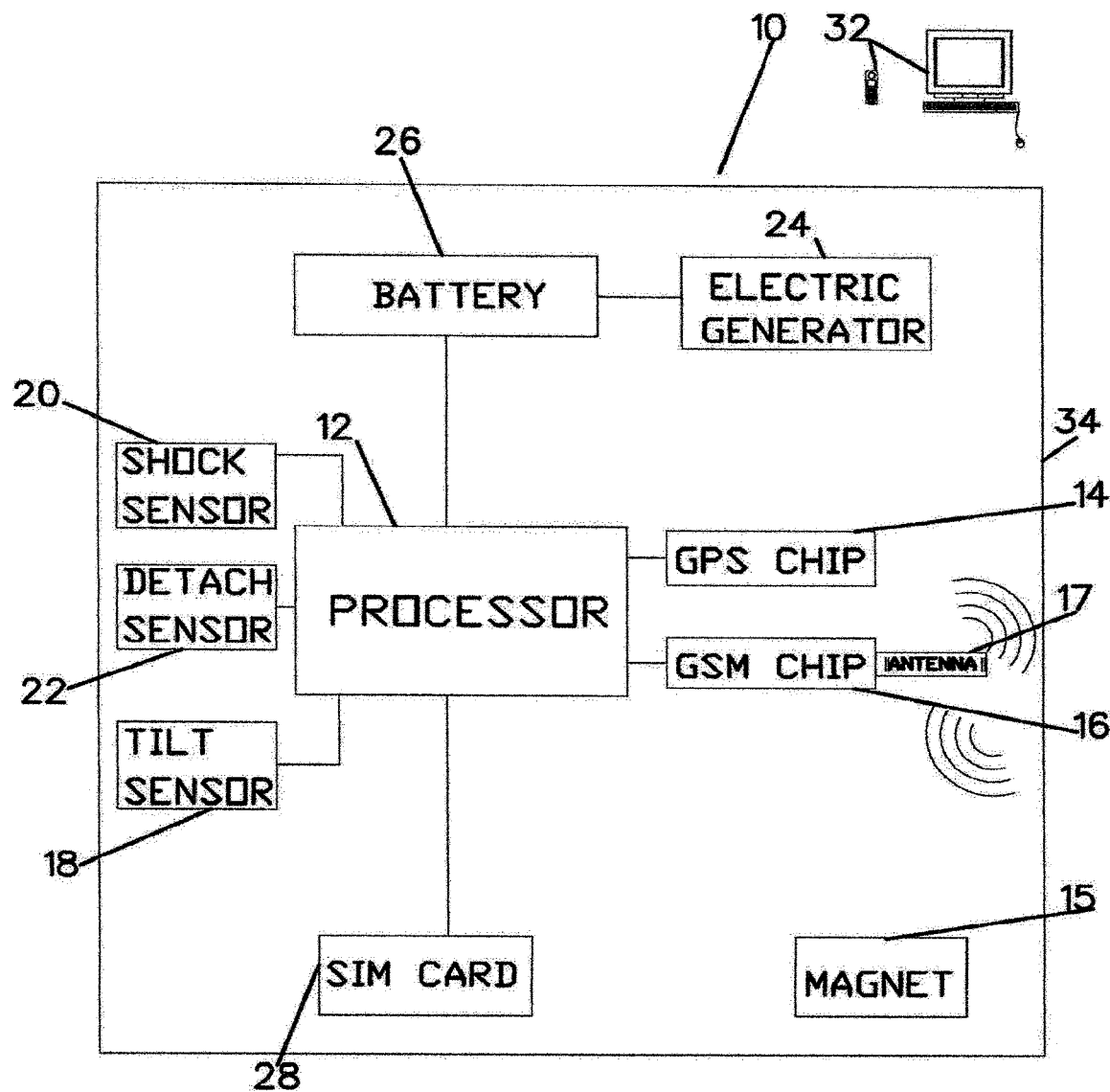
FIG. 1 is a schematic drawing presenting the components of the device of the present invention for tracking the loading and unloading of containers to and from a truck.

Presently presented is an embodiment of the invention of a device (10) for tracking the loading and unloading of containers to and from a truck.

Device (10) is composed of the components:

An encasing box (34) which contains:

A digital data processor (12) typically having a standard terminal communication board, 24-layer HDI PCB. A typical digital data processor used 24-layer HDI PCB. (known producers: PCBWell, Multitech Electron HK Ltd). The digital data processor is able to transmit data, either by a wire or by a wireless connection to a data receiving terminal system (32).

A GPS (Global Positioning System) (14), comprising a chip capable of receiving information from GPS satellites and accurately calculating geographical location. (A supplier of a typical GPS: U-blox7, https://www.u-blox.com).

A GSM chip (16) comprising a chip capable of receiving and sending\transmitting calls, SMS and data packets. Via GSM, the device will send calls and SMS, and via the GPRS using the GSM network, it will transmit data in the form of packets. Data packet consists of a string (few segment), each segment is a data representing data\info. (A supplier of a typical, GSM Chip: MTK6261—(MediaTek, at: http://mediatek-helio.com).

Standard GSM antenna (17).

A tilting sensor (18). (A typical sensor supplier: SQ-SEN-390 from Signal Quest, at: https://signalquest.com).

a rechargeable-chargeable battery (26). A typical recharged battery used: A 3.7V 20000 mAh Li-ion battery.

SIM card Socket (28).

Optionally, at least one powerful magnet (15) to connect the encasing box to the metal container.

Optionally, an electric generator (24) connected to the container outside of the encasing box.

Optionally, a shock sensor (20). (A typical sensor supplier: SQ-MIN-200 from Signal Quest, at: https://signalquest.com), to be either in the encased box or out of the encased box and connected to the container.

Optionally, a detach sensor (22). The detach sensor can be either a light sensor or a contact sensor typically connected to the container out of the encased box. (A typical sensor supplier: LDR sensor (Light Dependent Resistor) (code GM5528, of Shenzhen Wodeyijia Technology Co., Lt, at: http://szwdyj.com/En/

Out of encasing box (34) is a data receiving terminal system (32) being a server connected to the Internet for communication and dedicated software that receives and analyzes the data, records it and able to transmit the analyzed data for visual and/or written presentations.

Mode of operation of the device (10) of the invention is presently explained:

The encasing box (34) is typically constructed as a heavy-duty encasing-box made of rigid metal or/and plastic material(s), able to withstand strong vibrations and hard physical blows. Inside encasing box (34) the components listed above are stably fixated. The battery provides the electricity power required by the electricity consuming components. Alternatively, electrical generator (24), is placed out of encasing box (34) and connects and recharges the rechargeable battery (26). In another alternative, no battery (26) or electrical generator (24) are directly related to device (10), and device (10) obtains electrical power from an electric power source connected to the container positioned on a truck (an example: a truck carrying a refrigerated container). In deployment, encasing box (34) is reversible and firmly connected to the container whose unloading and/or loading activities are to be tracked. Optionally, the connection is done by a strong magnet (or magnets). The encasing box (34) can be connected (but not limited) to any of the location-places indicated in FIG. 2.

When device (10) is deployed, shock sensor (20) is connected to a container and records vibration from the container as when and as long as the container is traveling on a carrying platform. The data is transmitted to the digital data processor which turns on and off the electricity to the electricity consuming components. The purpose of shock sensor (20) is to save on the use of the stored electrical power.

The detach sensor (22) provides data in regards to the actual placement of the device on the container, giving an alert if the device is removed (the sensor being a contact sensor or if a light detecting sensor).

The tilt sensor (18) in encasing box (34) records the angular spatial configuration of a container (in the longitudinal dimension) relatively to the approximate base-line horizontal configuration of the carrying platform of the truck carrying the container, or approximate base-line horizontal configuration of the ground on which a container is placed.

The tilt sensor (18) is activated when the spatial angle of the container starts to increase from 0-degrees (in unloading) and stops it activity when the container returns to 0 degrees (in loading). The recorded data from the tilt sensor (18) is transmitted, to the digital data processor (12) which processes it to produce a specific container-carrying platform combination motion activity time course pattern curve. The produced specific motion activity time course pattern curve is compared and matched for fitness with a predetermined specific standard motion activity time course pattern curve. In parallel with data from the tilt sensor, the digital data processor obtains GPS data from the GPS chip (14) The processed tilt sensor data together with the GPS data is transmitted to a SIM card (28) and is transmitted via the GSM network ((16)+(17)) which transmit it to a data receiving terminal system (32) being a server connected to the Internet for communication and dedicated software that receives and analyzes the data, records it and able to transmit the analyzed data for visual and/or written presentations. Alternatively, the SIM card (28) can be removed from the encasing box (34) and the information be read and analyzed without being transmitted by the GSM chip ((16)) and (17)). The analyzed data enables the determination if and where and when an unloading and/or loading event took place.

Alternatively, the data from the tilt sensor (18) and data from the GPS chip (14) are transmitted to the digital data processor (12) and the digital data processor transmits the "raw" collected data to data receiving terminal system (32) where it is processed and analyzed to produce motion activity time course curves which are compared and matched with standard motion activity time course curves. Data receiving terminal system (32) may be, but not limited to, a smart phone or an internet connected computer system. In the data receiving terminal system (32) the data analyzed and is made available to be read and utilized.

Figure 5:
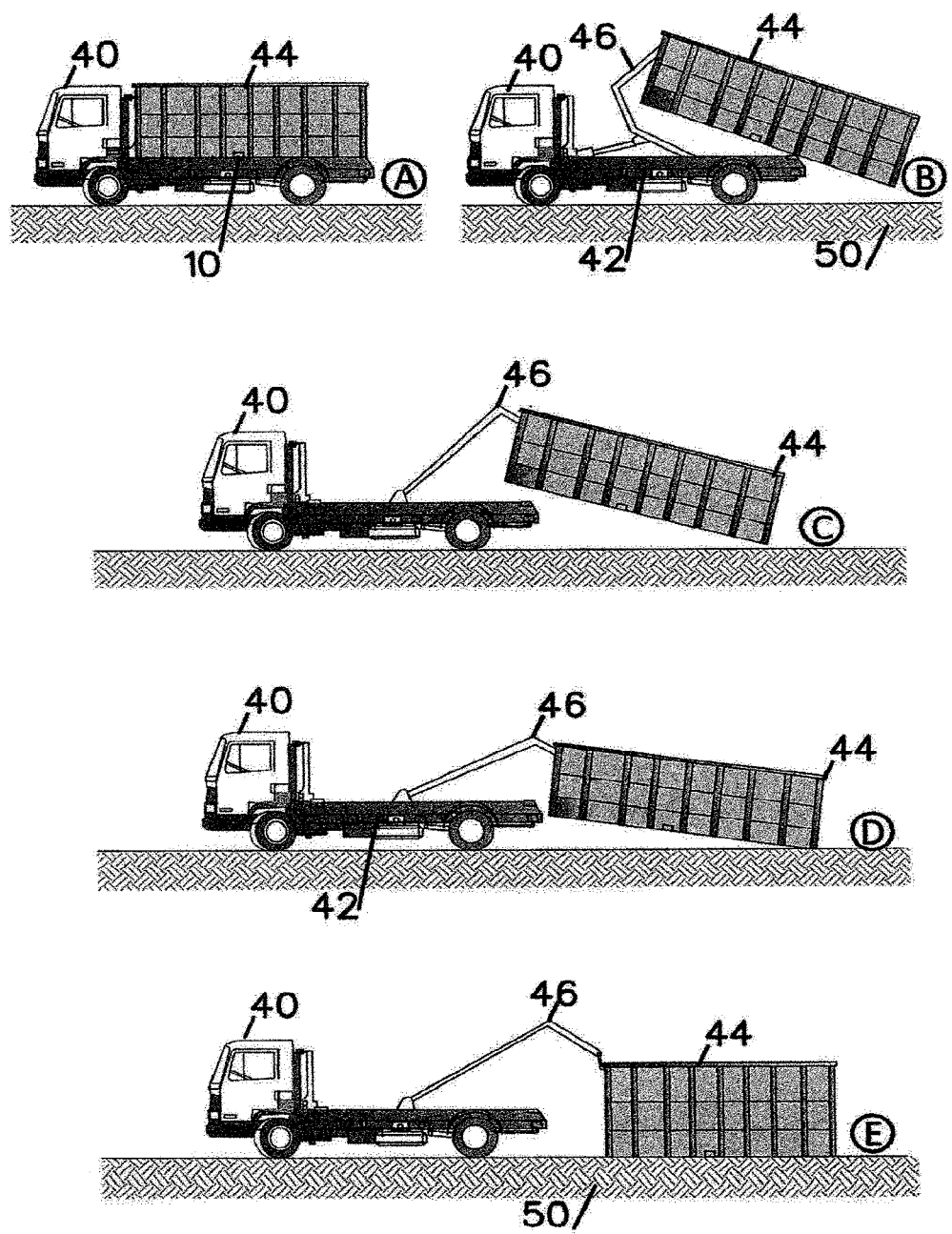
FIG. 5 is a series of illustrations (A to E) showing the sequence of activities of unloading and loading of an intermodal container from/to a truck; the truck shown in detail in FIG. 2.
Figure 7:
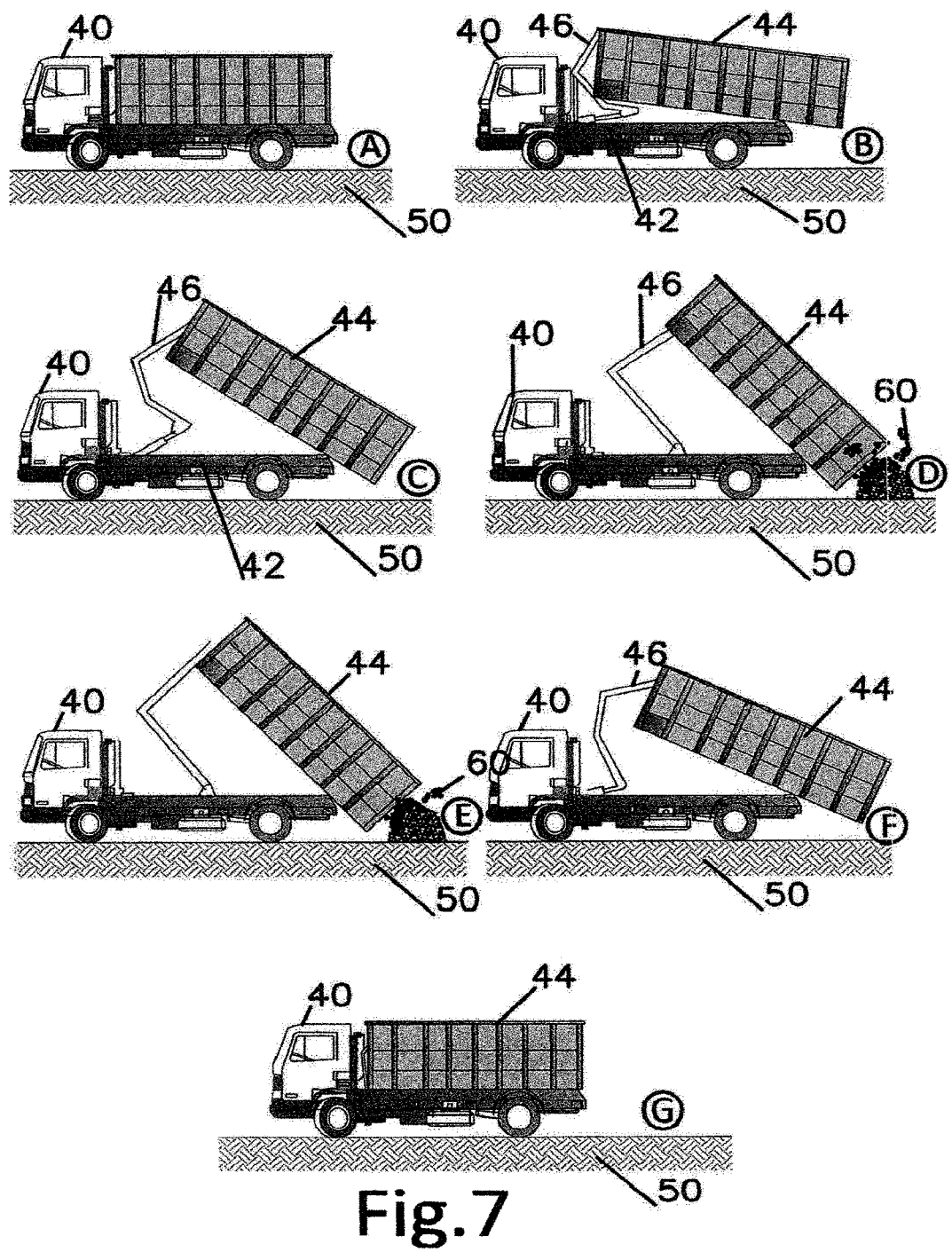
FIG. 7 is a series of illustrations (A to G) showing the sequence of activities of unloading of the content of an intermodal container placed on a truck, in the course in which the container is tilted, slid towards the ground at the back of the truck, lifted and lowered back to the truck while remaining in contact with the back edge of the truck.
Figure 8:
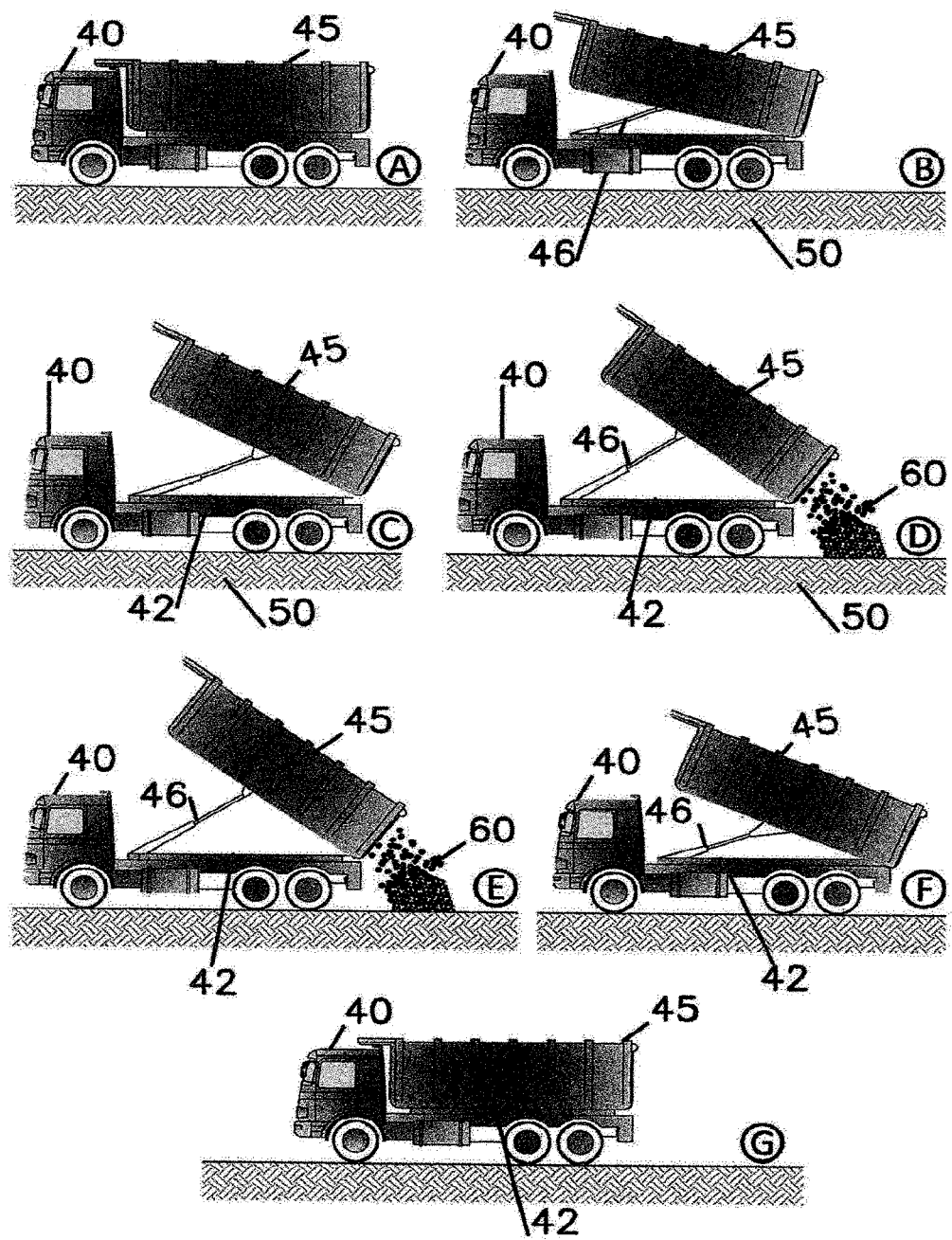
FIG. 8 is a series of illustrations (A to G) showing the sequence of activities of the unloading of the content of a container (not a standard intermodal) connected to a truck, done by tilting container and then lowering it back to the carrying platform of the truck.

To produce meaningful motion activity time course curves a specific truck has to carry a specific container (or containers having very similar characteristics) and to have the carried container loaded with loads having a specified weight range. Examples of how motion activity time course curves are similar (and how they differ from one another) are given in FIGS. 6 and 9. FIGS. 5, 7 and 8, illustrate different activities of unloading/loading of typical containers from typical carrying trucks, thus explaining the differences in the motion activity time course curves and the need to relate a specific container with a truck in producing the curves.

The present invention typically, relates to, but not limited to, a device for tracking the loading and unloading of containers on when a self-sufficient mechanism is used. The term "self-sufficient loading and unloading mechanism" in the context of the present invention, refers to a mechanism that typically comprises a hydraulically operated lifting/lowering-bar (or bars) that reversibly changes the spatial configuration angle of a container and carries out the loading and unloading of a container to and from the carrying platform of the truck. Alternatively, The term "self-sufficient loading and unloading mechanism" refers to an hydraulically operated lifting/lowering-bar (or bars) that reversibly changes the spatial configuration angle of a container and carries out the loading and unloading of a container while the container remains on the carrying platform of the truck. The self-sufficient loading and unloading mechanism is typically an integral component of a truck having a carrying platform, and requires no additional or external components to carry out the loading and unloading activities. See component (46) in FIG. 2, FIG. 5 and FIG. 7.

Figure 2:
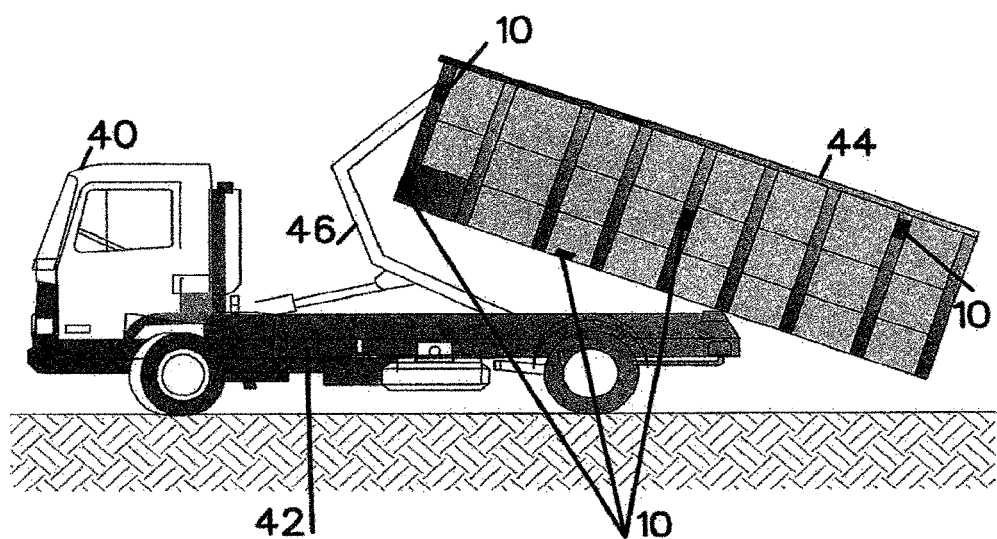
FIG. 2 is a schematic drawing illustrating a truck with a carrying-platform in the activity of loading or unloading an intermodal container, having connected to the container a device of the present invention for tracking the unloading and loading of containers.

FIG. 2 presents a detailed schematic drawing of a truck (40) with a carrying-platform (42) in the activity of loading or unloading an intermodal container (44) utilizing a self-sufficient loading and unloading mechanism (46), with the device (10) of present invention shown connected to various optional locations in the container (44).

Figure 3:
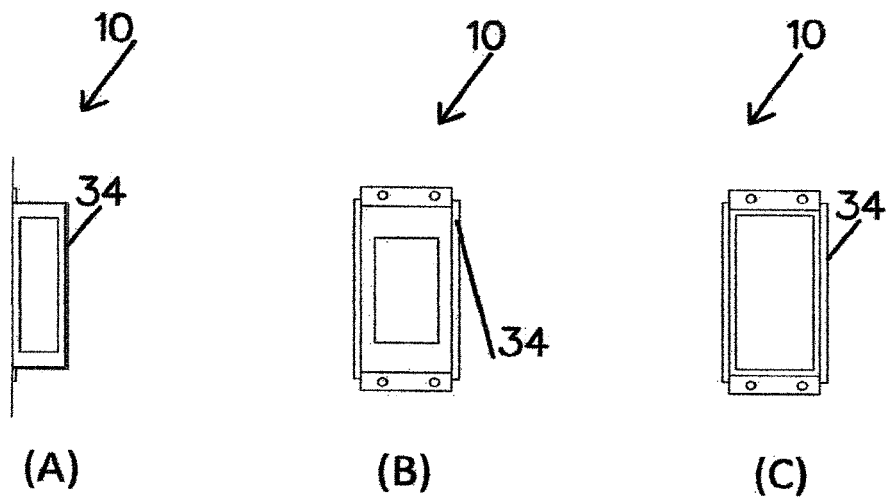
FIG. 3 is a schematic illustration of the encasing of the device of the present invention, shown from the side (A), front (B) and back (C).

FIG. 3 shows a schematic illustration of the external side of encasing (34) of the device (10) of the present invention. The components fixated within the encasing are detailed in FIG. 1. The encasing is shown from the side connected to a wall (designated A), from the front (designated B) and from the back (designated C).

Figure 4:
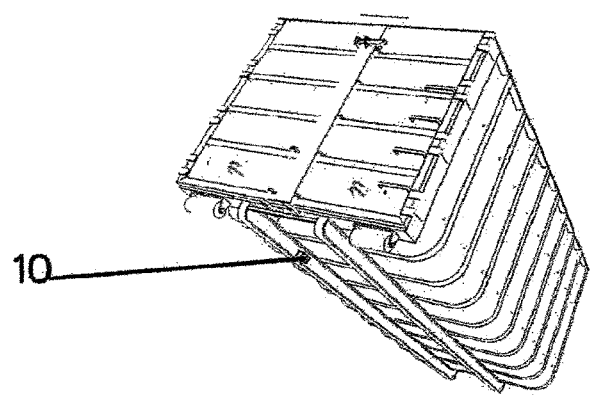
FIG. 4 is a schematic isometric illustration view of an intermodal container, seen from the side and bottom of the container with a tracking device of the present invention connected to it.

FIG. 4 is a schematic isometric illustration view of an intermodal container ((44) in FIG. 2) seen from the side and bottom of the container with a tracking device (10) of the present invention connected to it.

FIG. 5 presents a series of illustrations, indicated A to E, showing the sequence of the unloading and loading activities of an intermodal container from and to a truck. When the illustrations are viewed from E to A, the sequence of the loading activity of an intermodal container to a truck is viewed.

Illustration A of FIG. 5 shows truck (40), with the container (44) in a horizon configuration placed on the carrying platform of the truck.

Illustration B of FIG. 5 shows the self-sufficient loading and unloading mechanism (46) connected to the driver's-cabin edge-side of container (44). Mechanism (46) is shown unfolding and lifting container (44) from the carrying platform (42) of the truck (40). As it is lifted, container (44) tilts with an angle relatively to carrying platform (42) and slides towards the ground (50) from the carrying platform (42). Self-sufficient loading and unloading mechanism (46) controls the sliding rate of container (44).

Illustration C of FIG. 5 shows self-sufficient loading and unloading mechanism (46) continuing to raise container (44) up to a maximum height (thus, obtaining the maximum tilting degree-value) causing container (44) to complete the slide from carrying platform (42) and to almost reach the ground (50).

Illustration D of FIG. 5 shows truck (40) slowly advancing while the bottom edge of container (44) is in contact with the ground (50). As truck (40) advances, container (44) gradually changes its spatial configuration and reduces the angle of its tilt relatively to the ground.

Illustration E of FIG. 5 shows container (40) having completed its spatial configuration change and is horizontally placed on the ground (50). When container (44) is firmly placed on the ground, the self-sufficient loading and unloading mechanism (46) can be disconnected from the container (44) and is returned (folds back) to the truck (40).

Figure 6:
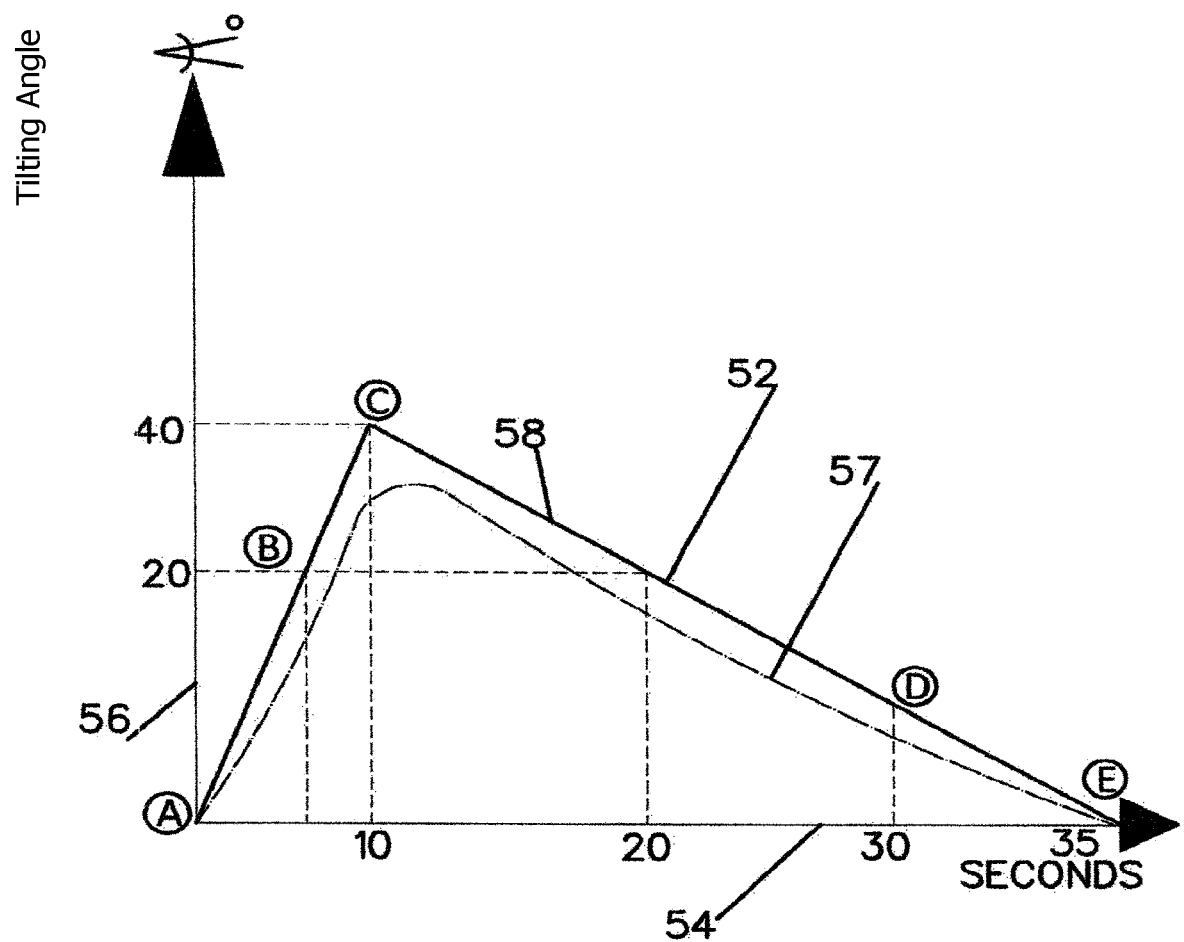
FIG. 6 is an illustration of both a standard motion activity time course curve and a motion activity time course curve, indicating time elapse versus the tilting angle of an intermodal container in the course of the unloading and loading activities of an intermodal container from and to a truck, illustrated in FIG. 5.

FIG. 6 is a graph (52) showing a specific standard motion activity time course pattern curve (58) and a recorded specific motion activity time course pattern curve (57) of a container. The curves correlate the elapse of time, shown in axis X (54) versus a tilting angle, shown in in axis Y (56) of an intermodal container (44) in the course of the sequence of unloading and loading activities of the container from and to a truck. The curves indicate the activity record of the unloading and loading process of container ((44) in FIG. 5). The progression of the sequence is presented in the graph by "stations" designated A to E. The designated "stations" are shown in the series of the illustrations (A to E) in FIG. 5. The time-elapse required to reach the maximum tilting angle of container (44) is designated as "C". As seen in the graph the unloading of the container (A to C) takes a considerably less time then loading of the container (C to E). Line (58) indicates the approximate expected pattern and expected limits a motion activity time course pattern curve for a specific container and a specific truck will have. In actual motion activity time course pattern curves (shown as curve (57)), the lines of the curves are typically not straight (indicating a linear change rate of the angle of the container in the course of unloading and loading). See text explaining FIG. 9 for further clarification of the difference between specific standard motion activity time course pattern curve and a specific motion activity time course pattern curve derived from a tracked container.

FIG. 7 presents a series of illustrations, indicated A to G, showing a sequence of unloading and loading activities of an intermodal container (44) from and to a truck (40). The intermodal container (44) is not removed from the carrying platform of the truck throughout the unloading and loading of the container.

Illustration A of FIG. 7 shows the truck (40), with the container (44) in a horizon configuration placed on the carrying platform of the truck.

Illustrations B and C of FIG. 7 shows the self-sufficient loading and unloading mechanism (46) connected to the driver's-cabin edge-side of container (44). Mechanism (46) is shown unfolding and lifting container (44) from the carrying platform (42) of the truck (40). As it is lifted, container (44) tilts with a sharp angle relatively to carrying platform (42) and slides towards the ground (50) from the carrying platform (42). Self-sufficient loading and unloading mechanism (46) controls the sliding rate of container (44).

Illustrations D of FIG. 7 shows self-sufficient loading and unloading mechanism (46) continuing to raise container (44) up to a maximum lifting height (thus, obtaining the maximum tilting degree-value) causing container (44) to slide from carrying platform (42) and to almost reach the ground (50) while self-sufficient loading and unloading mechanism (46) remains connected to the container. As the container (44) remains in its maximum tilting degree configuration, the content of the container (60) gradually slide from the container to the ground (50). Illustration E shows container (44) remaining in the maximum tilting degree configuration, as shown in illustration D, the content of the container continue to slide towards the ground (50) till the container is completely empty.

Illustrations F of FIG. 7 shows self-sufficient loading and unloading mechanism (46) pulling container (44) back to the carrying platform after emptying the container (illustration D and E).

Illustration G of FIG. 7 shows container (44) back in a horizontal configuration on the carrying platform of truck (40), as it was prior to the commencing of the unloading (illustration A).

In FIG. 7 illustrations A to G, show the sequence of the unloading and loading activities of an intermodal container from and to a truck. When the illustrations are viewed from G to A, the sequence of the loading activity of an intermodal container to a truck is viewed, without (of course) the reloading into the container the content of the container (60).

FIG. 8 presents a series of illustrations, indicated A to G, showing a sequence of unloading and loading activities of a container (45) (not a standard intermodal container) from and to a truck (40), with the container not removed from the carrying platform (42) of the truck (40).

Illustration A of FIG. 8 shows the truck (40), with the container (45) in a horizon configuration placed on the carrying platform of the truck.

Illustration B of FIG. 8 shows the self-sufficient loading and unloading mechanism (46) stretching a lifting bar and lifting container (45) in a tilting, angular configuration, towards the rear of truck (40).

Illustrations C of FIG. 8 show container (45) approaching the maximum lifting height (thus, obtaining the maximum tilting degree-reading) relatively to carrying platform (42) and illustration D show the container having reached maximum lifting height (meaning the maximum spatial angular configuration relatively to the carrying platform (42) of the truck (40)). On reaching the maximum tilted angle, the content of the container (60) are shown sliding from container (45) towards the ground (50), thus beginning the emptying the container which remains on the carrying platform (42) of the truck (40).

Illustration E of FIG. 8 shows the container (45) still in the maximum tilted angle, as shown in illustration D, and the content of the container (60) continuing to slide from the container till the container is completely empty.

Illustration F shows self-sufficient loading and unloading mechanism (46) lowering container (45) from the maximum tiled angle towards the carrying platform (42).

Illustration G of FIG. 8 shows container (45) back in a horizontal configuration on the carrying platform of truck (40), as it was prior to the commencing of the unloading (illustration A).

As in FIG. 7, illustrations A to G, show the sequence of the unloading and loading activities of an intermodal container from and to a truck. When the illustrations are viewed from G to A, the sequence of the loading and unloading activities of an intermodal container to a truck is viewed.

Figure 9:
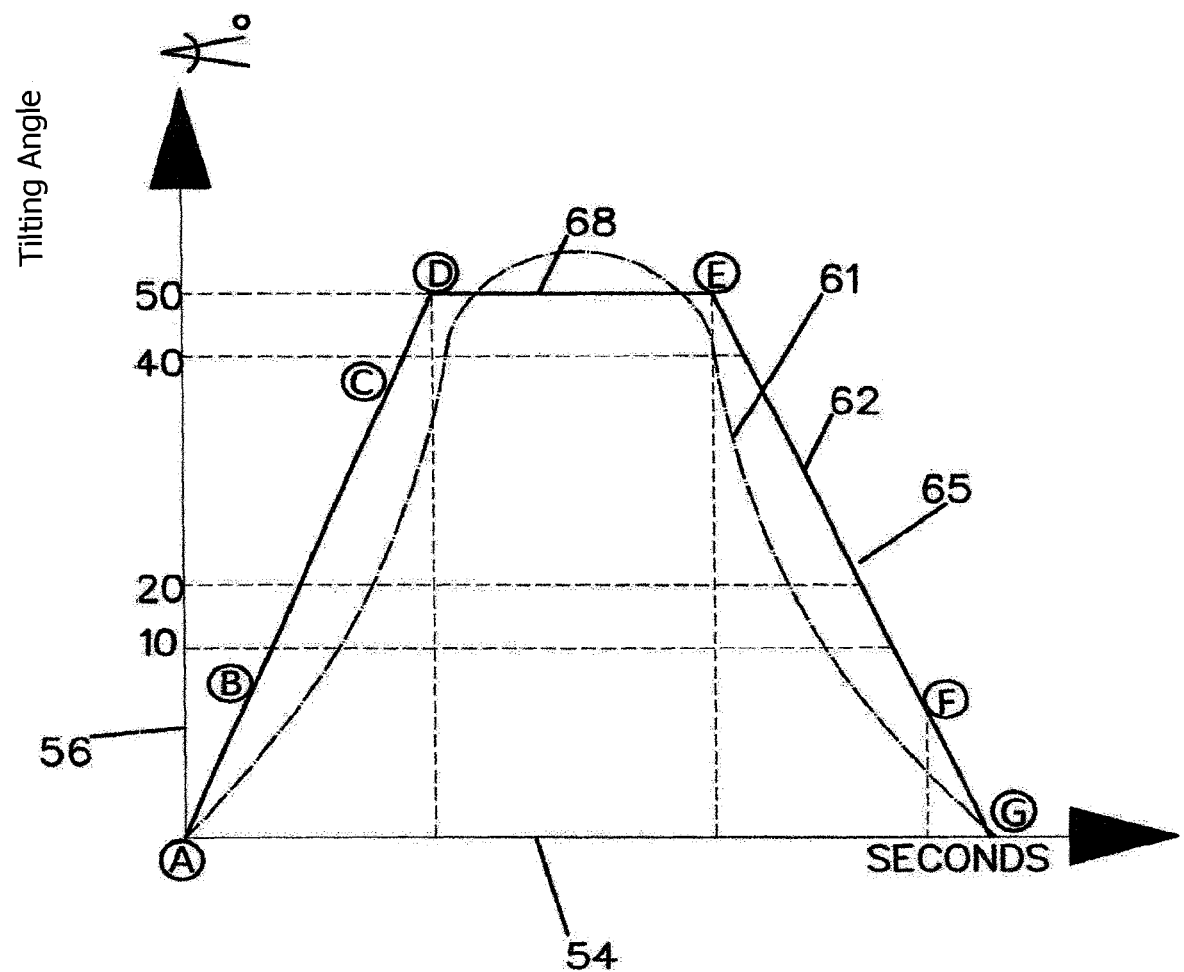
FIG. 9 is a schematic illustration of both a standard motion activity time course curve and a motion activity time course curve, indicating time elapse versus the tilting angle of a container in the course of the unloading and loading activities of a container from and back to a carrying platform of a truck, illustrated in FIG. 7 and FIG. 8.

FIG. 9 is a graph (65) showing both a specific standard motion activity time course pattern curve (62) and a recorded motion activity time course pattern curve (61). The graph shows the correlation of the elapse of time, shown in axis X (54) versus the tilting angle of the container ((44) and (45) in FIGS. 7 and 8, respectively)), shown in axis Y (56), in the course of the sequence of unloading and loading activities of the containers from and to a truck. The progression of the sequence of activities is presented in the graph by "stations" designated A to G. The designated "stations" are shown in the series of the illustrations (A to G) in FIG. 7 and FIG. 8. The time-elapse required to reach the maximum tilted angle of the container ((44) and (45) in FIG. 7 and FIG. 8, respectively) is designated as "D". The maximum tilted angle is maintained for a time period, which terminates at E. Line (62) indicates the approximate expected with the expected limits a motion activity time course pattern curve for a specific container and a specific truck will have. In an actual motion activity time course pattern curve (61), the lines of the curves are typically not straight, as shown in line 62 (indicating a linear change rate of the angle of the container in the course of unloading and loading) and the maximum tilted angle of the container does not maintained constant (line between D and E). Each combination of a specific container and a specific carrying platform has its own, characteristic motion activity time course pattern curve.

If the "fitness results" analysis of the comparison and matching ("fitness results" meaning: determining by an algorithm the degree of correlation) between the specific motion activity time course pattern curve ((61) in FIG. 9) derived from a tracked container and the specific standard the motion activity time course pattern curve is found to be well fit ((62) in FIG. 9), together with the GPS recordings, it is possible to determine if, where and when a container that returned from a travelling mission was unloaded and loaded.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

We claim:

1. A method for tracking the unloading of containers from and onto carrying platforms of trucks, using unloading motion activity time course patterns characteristic of a specific container in combination with a specific carrying platform of a truck, said method comprising:
   providing a device which is connected to a specific container, said device having a tilt sensor that records the spatial configuration tilting angle of said specific container in the time course of unloading from a specific platform of a truck, the tilting angle being measured from the angle of the specific container relatively to the specific platform of the truck,
   producing a motion activity time course pattern curve from the angle of tilt obtained by the tilt sensor in the time course of unloading from the specific platform of the truck,
   comparing and matching said motion activity time course pattern curve for fitness to a predetermined standard motion activity time course pattern curve of the the specific container and the specific carrying platform of the truck,
   transmitting the results of said comparison and matching to a data receiving terminal system,
   enabling, if the fitting of the curves is close, together with GPS data from said device, to determine if, where and when unloading of said specific container took place.

2. The method of claim 1, wherein the unloading terminates with the emptying of the contents from the container.

3. The method of claim 1, wherein the unloading terminates with the container from the platform of the truck.

4. A device for tracking the unloading of a specific container from a specific carrying platform of a truck, using the unloading motion activity patterns produced by said container, said device comprises:
   an electricity supply source,
   a data receiving terminal system,
   an encasing box, said encasing box comprises components:
      a digital data processor,
      a GPS (Global Positioning System),
      a GSM chip,
      a tilt sensor,
      a rechargeable battery,
      SIM card,
   wherein, said encasing box is reversible and firmly connected to said container,
   wherein, said components of said encasing box are firmly fixated within said encasing box and said electricity consuming components of said encasing box obtain electric power from said rechargeable battery,
   wherein, said tilt sensor records the angle of tilt of said container during the time duration of unloading of said container from and onto said carrying platform of a truck,
   wherein, said tilt sensor transmits said recorded data to said data digital data processor,
   wherein, said GPS sends data in parallel to said data sent from said tilt sensor to said digital data processor,
   wherein, said digital data processor processes said tilt recorded data comprising the angle of tilt obtained by the tilt sensor in the time course of unloading from a specific platform of the truck to produce a motion activity time course pattern curve specific of the said container and compares and matches said produced specific motion activity time course pattern curve to a predetermined standard motion activity time course pattern curve for said specific container and said specific carrying platform of a truck, wherein the tilting angle is measured from the angle of the specific container relatively to the specific platform of the truck, wherein, by comparing and matching said specific motion activity time course pattern curve and a standard motion activity time course pattern curve, together with said GPS data, said digital data processor determines if there is a close match, and by so determining when and where an unloading of said specific container took place, wherein, said determination of unloading of said specific container is transmitted to a SEVI SIM card and is transmitted by said GSM system to said data receiving terminal system.

5. The device of claim 4, wherein an electricity generator charges said rechargeable battery in said encasing box.

6. The device of claim 4, wherein said encasing box includes a shock sensor.

7. The device of claim 6, wherein said shock sensor generates vibrations data from vibrations of said container during traveling of said container on said carrying platform of said truck, said data of said shock sensor is transmitted to said digital data processor, said digital data processor, in response to said data, turns on and off the electricity to the electricity consuming components in said encasing box.

8. The device of claim 4, wherein said encasing box also includes at least one strong magnet, said magnet reversibly connects said encasing box to said specific container.

9. The device of claim 4, wherein said data receiving terminal system is a computer system.

10. The device of claim 4, wherein said data receiving terminal system is a smart telephone.

11. The device of claim 4, wherein said encasing box is produced of a rigid material.

12. The device of claim 4, wherein the unloading terminates with the emptying of the contents from the container.

13. The device of claim 4, wherein the unloading terminates with the container from the platform of the truck..

* * * * *